United States Patent
Ben Chetrit et al.

(10) Patent No.: US 8,094,680 B1
(45) Date of Patent: Jan. 10, 2012

(54) AUTOMATIC CONFIGURATION

(75) Inventors: Ronen Ben Chetrit, Kiriat Ono (IL);
Itai Ephraim Zilbershtein,
Hod-Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 388 days.

(21) Appl. No.: 12/235,915

(22) Filed: Sep. 23, 2008

(51) Int. Cl.
*H04J 3/16* (2006.01)

(52) U.S. Cl. ........ 370/466; 370/253; 370/352; 709/217; 709/219; 709/220

(58) Field of Classification Search ................. 370/352; 707/620; 380/255; 717/173, 174
See application file for complete search history.

(56) References Cited

U.S. PATENT DOCUMENTS

| | | | |
|---|---|---|---|
| 5,280,613 A | | 1/1994 | Chan et al. |
| 5,555,416 A | | 9/1996 | Owens et al. |
| 5,715,397 A | | 2/1998 | Ogawa et al. |
| 6,182,212 B1 | | 1/2001 | Atkins et al. |
| 6,341,291 B1 | | 1/2002 | Bentley et al. |
| 6,446,260 B1 | * | 9/2002 | Wilde et al. .................... 717/173 |
| 6,609,130 B1 | | 8/2003 | SaulPaugh et al. |
| 7,019,558 B1 | * | 3/2006 | Jacobson et al. ................ 326/38 |
| 2005/0256892 A1 | | 11/2005 | Harken |
| 2006/0010438 A1 | * | 1/2006 | Brady et al. .................... 717/174 |
| 2006/0136424 A1 | | 6/2006 | Nuggehalli et al. |
| 2006/0182037 A1 | | 8/2006 | Chen et al. |
| 2006/0268829 A1 | * | 11/2006 | Nedeltchev ...................... 370/352 |
| 2007/0192823 A1 | | 8/2007 | Anderson et al. |
| 2009/0003603 A1 | * | 1/2009 | Wessel et al. .................. 380/255 |
| 2010/0205147 A1 | * | 8/2010 | Lee ................................ 707/620 |

OTHER PUBLICATIONS

OASIS: "An Introduction to WSDM"; Committee Draft, Feb. 24, 2006, downloaded from http://www.oasis-open.org/committees/download.php/16998/wsdm-1.0-intro-primer-cd-01.doc. on Jul. 28, 2008, 26 pages.

Service Modeling Language, Version 1.1; W3C Working Draft; Mar. 3, 2008, downloaded from http://www.w3.org/TR/sml/, on Jul. 28, 2008; 32 pages.

ALTOVA®: "MapForce—graphical data mapping, conversion, and integration tool"; downloaded from http://www.altova.com/products/mapforce/data_mapping.html: on Jul. 28, 2008; 3 pages.

\* cited by examiner

*Primary Examiner* — Robert W. Wilson
*Assistant Examiner* — Mohamed Kamara
(74) *Attorney, Agent, or Firm* — Sheridan Ross P.C.

(57) ABSTRACT

A method of generating an intermediate format for configuration values of telephony devices. The method includes collecting lists of configuration fields from a plurality of administrable devices; and generating a configuration file format, which includes more configuration fields than supported by any one of the administrable devices, based on the collected lists.

20 Claims, 3 Drawing Sheets

AUTOMATIC CONFIGURATION

FIELD OF THE INVENTION

The present invention relates to methods of configuration of devices.

BACKGROUND OF THE INVENTION

In offering for sale devices that require complex configuration, one of the major deterrents of clients from purchasing the devices is the costs of configuration. This is especially important when a new device is offered as an upgrade for an existing device, in which case the client may well forego the upgrade to avoid the headache involved in configuration.

U.S. Pat. No. 5,555,416 to Owens et al., titled: "Automated Software Installation and Operating Environment Configuration for a Computer System based on Classification Rules", describes methods for simplifying configuration of computer systems.

U.S. Pat. No. 5,280,613 to Chan et al., titled: "ANDF Installer Using the HPCODE-PLUS Compiler Intermediate Language", describes a method of configuring computers with software, in which the software is created in a neutral intermediate language and from this language is translated to the specific languages of the computers receiving the software.

US patent publication 2006/0182037 to Chen et al. describes a method of configuring routing elements, in which the configuration is performed by a human user in a high level language and is automatically converted to specific formats required by various routing network elements.

These patents describe methods for simplifying the initial installation, but still require reinstallation in the case of system upgrade.

Various suggestions have been made regarding transferring high level programming commands from one programming language and/or environment to another.

U.S. Pat. No. 6,182,212 to Atkins et al., titled "Method and System for Automated Migration of user settings to a Replacement Computer System", describes a method of transferring user system settings from an old computer to a new computer, through a network connection or on a diskette. The method performs a plurality of predetermined steps of collecting information from the old computer, such as mapped drivers, TCP/IP settings and DNS settings and then installs these settings on the new computer. The method of this patent requires a program which runs on both the old and new system and is specifically designed for using on the old and new systems. Therefore, it is generally useful only for general purpose computers using the same or similar operating systems.

US patent publication 2005/0256892 to Harken describes a method of transferring extract, transform and load (ETL) jobs between different platforms, passing through an intermediate language. The commands of the source ETL job are translated into an intermediate ETL language and the commands from the intermediate language are translated into a destination ETL job.

US patent publication 2007/0192823 to Anderson et al., titled "Policy Administration and Provisioning", describes a method of setting policies of communication devices, in which the policies are defined in an intermediate language and are dynamically converted to a plurality of device policy definition formats supported by the devices. Changes performed in the other policy definition formats are converted back to the intermediate format. In relation to FIG. 3, Anderson suggests identifying policies of a first device and applying the identified policies to a second device. The identification may be performed through a dynamic interface receiving a publication of the set of policies, use of a mining service or by accessing a separate data store having a copy of the set of policies.

U.S. Pat. No. 5,715,397 to Ogawa, U.S. Pat. No. 6,609,130 to SaulPaugh et al., and US patent publication 2006/0136424 to Nuggehalli et al. describe methods of transferring various types of data between devices using different data formats.

SUMMARY OF THE INVENTION

An aspect of some embodiments relates to a method of transferring configuration parameter values between telephony devices such as private branch exchanges (PBXs), through an intermediary format following a telephony vocabulary (referred to herein as a TPV) defined as a common denominator for a plurality of different types of devices. When the configuration of an old telephony device is to be transferred to a new device, the contents of the old telephony device are dumped out, for example as tabled raw numerical data. The contents of the configuration fields of the old device are transferred to corresponding fields of the intermediary format and are then converted from the intermediary format into a format of a new device to replace the old device. The new and old devices may be of totally different models with very different formats. The use of raw numerical data rather than high level configuration rules, although making the conversion harder, makes the access to the old device substantially independent of its design.

Using an intermediary format streamlines the configuration process, although adding an additional step to the configuration. The use of the intermediary format separates the task of conversion from the format of the old device, from the task of conversion into the format of the new device. Thus, processes created for conversion from the format of an old device, may be used as a first step for conversion into the format of any new device. Similarly, processes created for conversion into the format of a new device may be used as a second step for conversion into the format of the new device from any old device. Accordingly, for conversion from a specific old device to a specific new device, there is no need to generate a new conversion process, even if conversion between these two specific devices was never performed before, as long as conversion was previously performed from the specific old device to any new device and conversion was previously performed from any old device to the specific new device.

There is therefore provided in accordance with an exemplary embodiment of the invention, a method of generating an intermediate format for configuration values of telephony devices, comprising collecting lists of configuration fields from a plurality of administrable devices and generating a configuration file format, which includes more configuration fields than supported by any one of the administrable devices, based on the collected lists.

Optionally, generating the file format comprises generating a format not supported by any of the plurality of administrable devices from which lists of configuration fields were collected. Optionally, the method includes evaluating the complexity of administrable devices based on a comparison of their configuration fields to the configuration file format.

Optionally, the administrable devices comprise telephony devices. Optionally, the method includes transferring the configuration settings of a first telephony device to a second telephony device, by converting the configuration values of the first device into the generated telephony configuration file format and from the generated telephony configuration file format to a format of the second telephony device. Optionally, the telephony configuration file format includes more configuration fields than both the first and second telephony devices have together. Optionally, the telephony configuration file format includes configuration fields relating to a plurality of different communication protocol layers. Optionally, the configuration file format includes a plurality of configuration fields belonging to a user profile category and at least one of the following categories routing, physical layout, and automatic call handling. Optionally, the configuration file format includes a plurality of configuration fields belonging to a user profile category and an automatic call handling group or even to each of the following categories user profile, routing, physical layout, and automatic call handling.

There is further provided in accordance with an exemplary embodiment of the invention, a method of configuring an administrable device, comprising providing an intermediary format serving as a common denominator for a plurality of different administrable devices, dumping configuration values, from a first administrable device, which is to be replaced, converting the dumped configuration values into the intermediary format, by a first process designed for devices of the type of the device being replaced, converting the configuration values from the intermediary format into a format of a second device which is to replace the first device, by a second process designed for the type of the second device; and loading the configuration values in the format of the second device into the second device. Optionally, dumping the configuration values comprises dumping as a sequence of values of configuration fields. Optionally, dumping the configuration values comprises dumping as a sequence of values of configuration fields in the form of a relational database.

Optionally, dumping the configuration values comprises dumping as a sequence of values of configuration fields in the form of a comma separated data file. Optionally, dumping the configuration values comprises dumping as a sequence of values of configuration fields, without statements in a high level computer language or a human language, linking between the fields. Optionally, dumping the configuration values comprises dumping values organized in a plurality of tables, each table including one or more records.

Optionally, the number of tables is greater than the average number of records in the tables. Optionally, the first and second processes comprise ETL jobs. Optionally, the first telephony device comprises a private branch exchange. Optionally, the intermediary telephony device format has a relational format. Optionally, the intermediary telephony device format includes more configuration fields than both the first and second telephony devices have together. Optionally, the intermediary telephony device format includes configuration fields relating to a plurality of different communication protocol layers. Optionally, the intermediary telephony device format includes a plurality of configuration fields belonging to each of the following categories: user profile, routing, physical layout, and automatic call handling.

Optionally, the configuration file format includes a plurality of configuration fields belonging to a user profile category and at least one of the following categories routing, physical layout, and automatic call handling. Optionally, the configuration file format includes a plurality of configuration fields belonging to a user profile category and an automatic call handling group. Optionally, the method includes analyzing the first process or the second process in order to provide an indication of the extent of configuration fields covered by the first device or the second device. Optionally, the method includes providing an indication of configuration fields included in the intermediary telephony device format not supported by the first process and/or by the second process. Optionally, providing an indication of configuration fields included in the intermediary telephony device format not supported by the second process comprises providing an indication of configuration fields supported by at least a predetermined percentage of examined devices but not supported by the second device.

Optionally, the method includes providing a list of configuration fields for which the conversion into the intermediary telephony device format or from the intermediary telephony device format was not successful. Optionally, the method includes changing the design of the first or second device responsive to the list of configuration fields.

There is further provided in accordance with an exemplary embodiment of the invention, a configuration aiding apparatus, comprising an interface, a processor configured to receive configuration field values in the form of raw data from a first telephony device, through the interface, to convert the received configuration values into an intermediary telephony device format, to convert the configuration values from the intermediary telephony device format into a format of a second device, and to provide the configuration values in the format of the second device through the interface.

Optionally, the processor is configured to provide an indication of configuration fields included in the intermediary telephony device format not supported by the second device.

There is further provided in accordance with an exemplary embodiment of the invention, a method of configuring a telephone device, comprising dumping configuration values, from a first telephony device, into a database of tables of raw data, converting the dumped configuration values into an intermediary telephony format, by a first process designed for devices of the type of the device being replaced, converting the configuration values from the intermediary telephony device format into a format of a second device which is to replace the first device, by a second process designed for the type of the second device; and loading the configuration values in the format of the second device into the second device.

Optionally, dumping the configuration values comprises dumping as a sequence of values of configuration fields in the form of a relational database.

BRIEF DESCRIPTION OF THE DRAWINGS

The present invention will now be described in the following detailed description of exemplary embodiments with reference to the attached figures. Generally, only structures, elements or parts that are germane to the discussion are shown in the figures.

DETAILED DESCRIPTION OF SOME EMBODIMENTS

Figure 1:
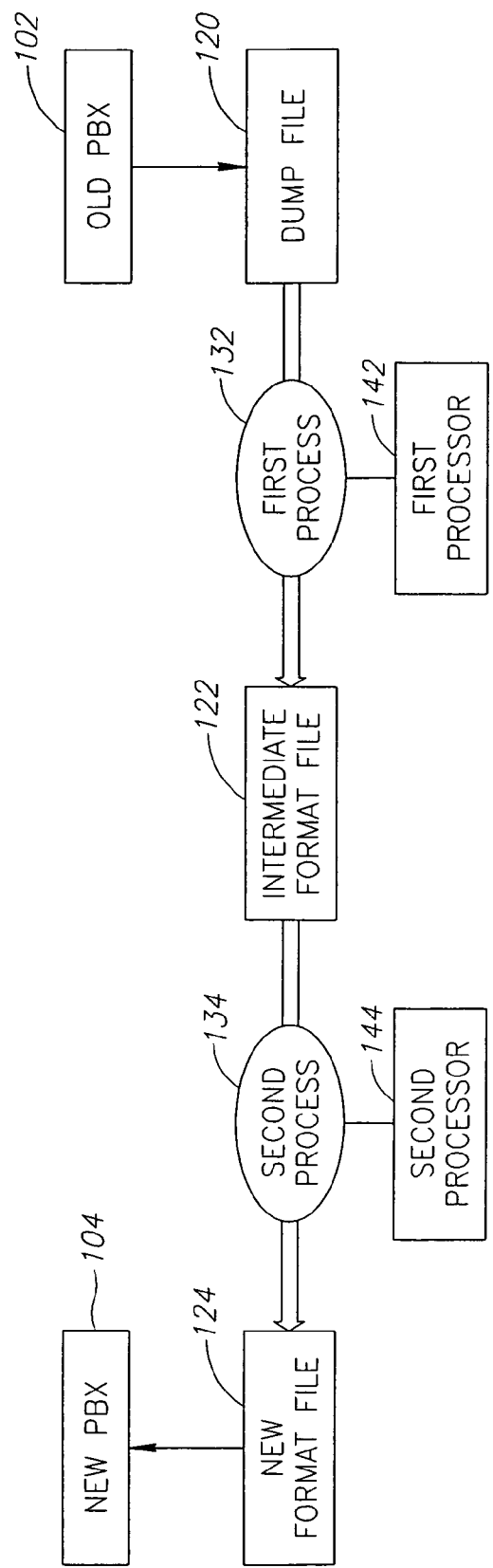
FIG. 1 is a schematic illustration of an upgrade process in a telephony communication network, in accordance with an exemplary embodiment.

FIG. 1 is a schematic illustration of an upgrade process, in accordance with an exemplary embodiment. A new private branch exchange (PBX) 104 is to replace an old PBX 102. In order to avoid reconfiguring new PBX 104 from scratch, the configuration fields of PBX 102 are dumped out as a dump file 120. The contents of dump file 120 are converted into an intermediate format file 122, in accordance with a predetermined generic telephony vocabulary. Intermediate format file 122 is converted into a new format file 124 suitable for use by PBX 104, and this file 124 is loaded into PBX 104.

The conversion of data file 120 into intermediate format file 122 is optionally performed by a dedicated first process 132 which is suitable for use with all files dumped from PBXs of the type of PBX 102. Similarly, the conversion from intermediate format file 122 to new format file 124 is optionally performed automatically by a dedicated second process 134, which is suitable for handling files in the intermediate format to be moved to PBXs of the type of new PBX 104. The use of two separate processes 132 and 134 in performing the conversion allows generating processes which can be used for a wide variety of conversion scenarios, rather than processes which can be used only for specific source and destination devices.

In FIG. 1, first process 132 runs on a first processor 142 and second process 134 runs on a second processor 144. It is noted, however, that both of processes 132 and 134 may run on the same processor.

Figure 2:
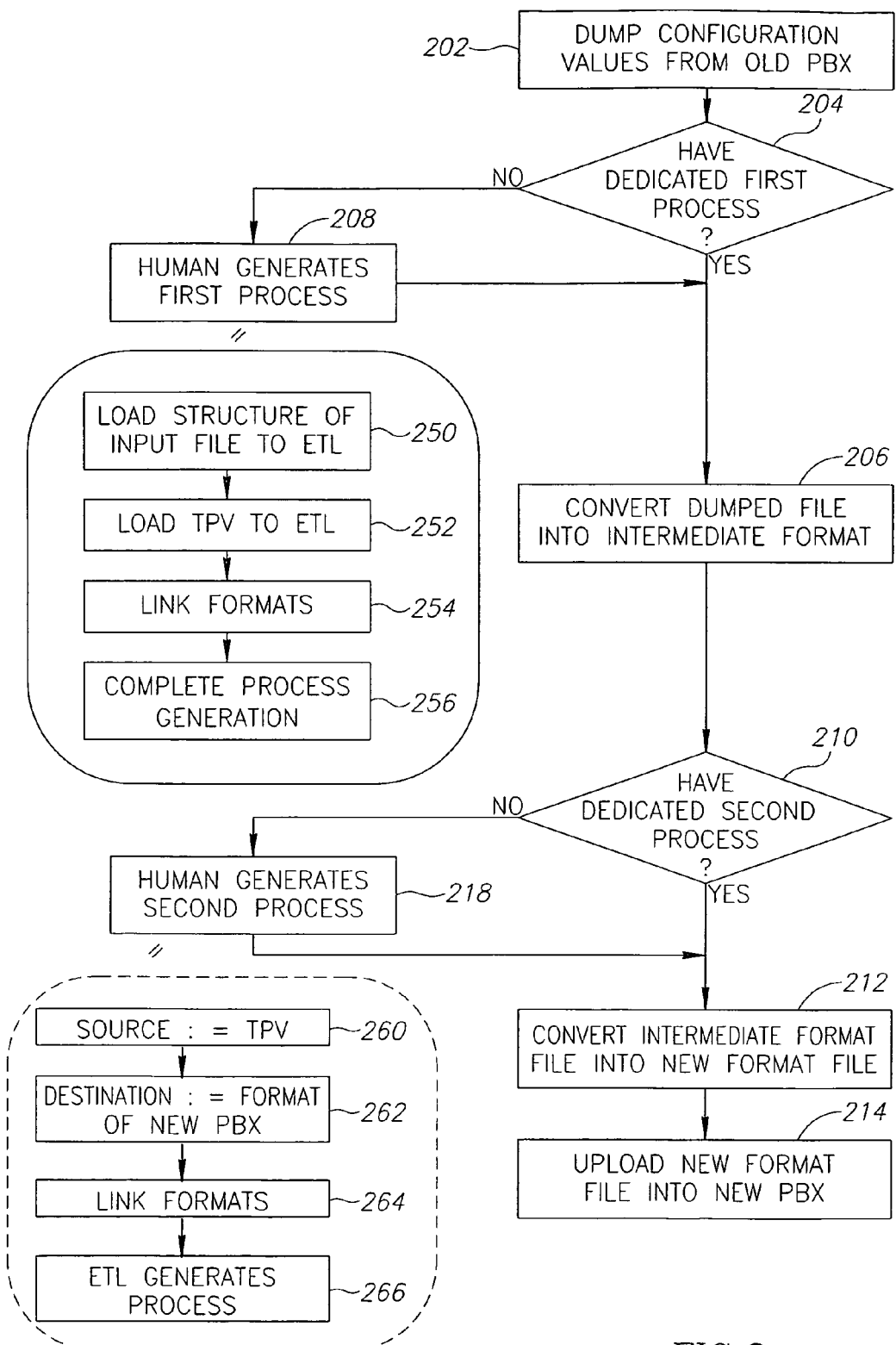
FIG. 2 is a flowchart of acts performed in replacing an old PBX with a new PBX, in accordance with an exemplary embodiment.

FIG. 2 is a flowchart of acts performed in replacing an old PBX 102 with a new PBX 104, in accordance with an embodiment. The values of the configuration fields of old PBX 102 are dumped (202) out into a data file 120. If (204) a dedicated first process 132 for the specific format of old PBX 102 is available, the first process 132 is used to convert (206) the dumped data of data file 120 into an intermediate format file 122, which is in accordance with a predetermined generic telephone vocabulary (TPV). If (204), however, such a first process 132 is not available, a human programmer generates (208) the first process 132, and the generated process is used for the conversion (206). The generated first process is optionally stored in a database of available first processes 132 and when a conversion is required again from the same type of device as old PBX 102, the specific first process 132 will be available for use and will not need to be regenerated. First process 132 will be useable and will not need to be regenerated, even if the old PBX 102 of the same type will be upgraded to a different type of new PBX 104, because of the use of an intermediate format file 122.

After the conversion (206) into the intermediate format 122, if (210) a dedicated second process 134 for new PBX 104 is available, the intermediate format 122 is converted (212) by the process 134 into a new format file 124. If (210), however, such a second process 134 is not available, a human programmer generates (218) the second process 134. The generated second process 134 is then used to convert (212) intermediate format 122 into new format file 124. As with the first process, the generated second process is optionally stored in a database of available second processes 134 and when a conversion is required again to the same type of device as new PBX 104, the specific second process 134 will be available for use and will not need to be regenerated. New format file 124 is uploaded (214) into new PBX 104 and new PBX 104 is employed in place of old PBX 102.

The upgrade process of FIG. 2 may be performed entirely by a technician of the supplier of the new PBX 104, or may be performed by the purchaser of the new PBX 104. In some embodiments, the supplier of a new PBX 104 provides with it the respective second process 134 of the specific type of PBX. Optionally, the supplier of the new PBX 104 also provides a plurality of first processes 132 for various types of PBXs which are expected to be upgraded to the new PBX 104. The processes 132 and 134 may be supplied with the new PBX 104, for example on a CD or other storage medium, or may be supplied using other methods, such as on a website allowing download of required processes 132 and 134.

Figure 3:
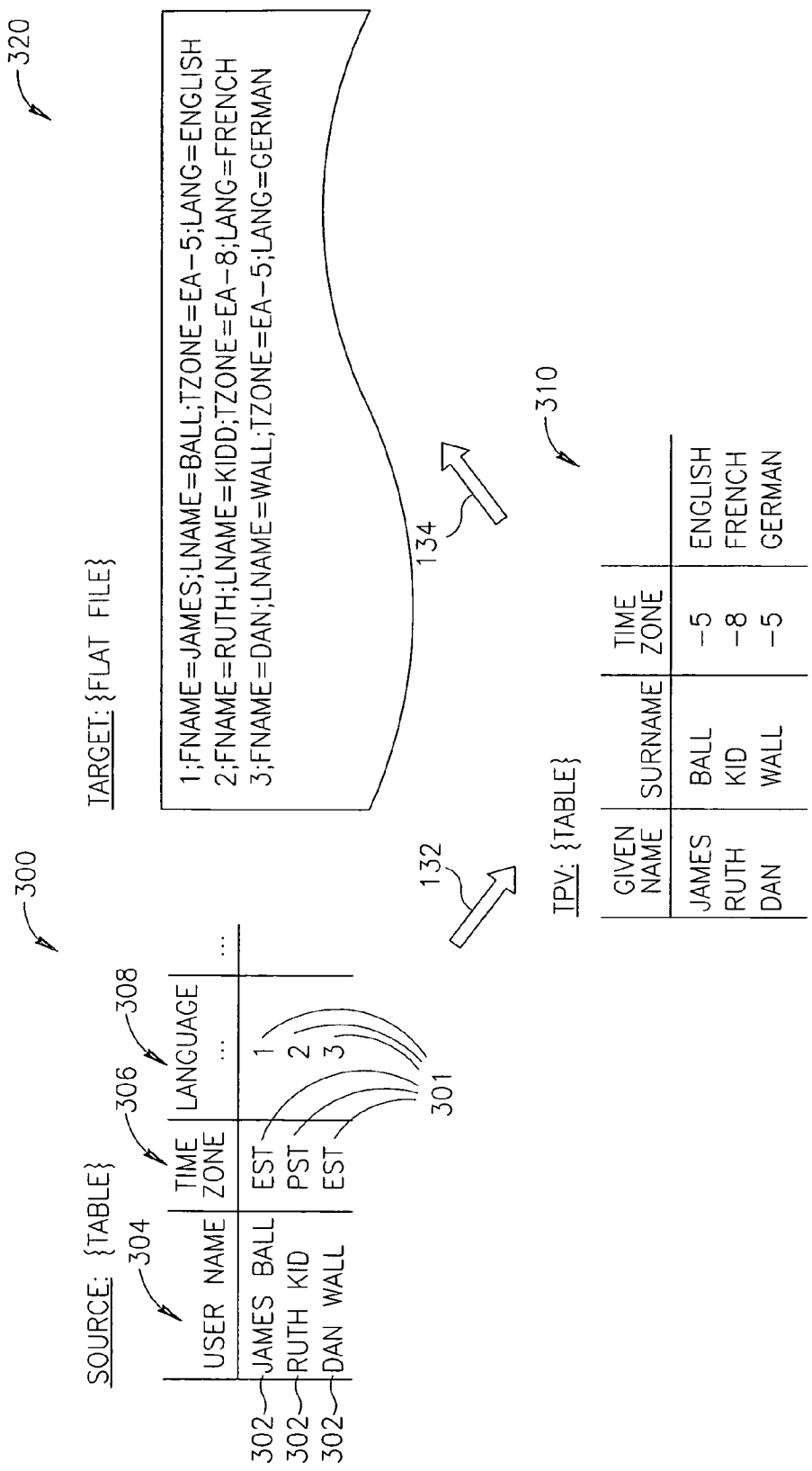
FIG. 3 is a schematic illustration of a conversion process, in accordance with an exemplary embodiment.

FIG. 3 is a schematic illustration of conversion of configuration data from one format to another, illustrated on a portion of a single table, in accordance with an exemplary embodiment. A table 300 from dump file 120 of old PBX 102, includes a plurality of fields 301 organized in records 302 listing respective user names 304, together with information about the users, such as their time zone 306 and preferred language 308. New PBX 104 represents the same data in a different manner, for example by a flat file 320, including a comma separated list of parameter names with their values. In addition, the format of new PBX 104 uses different values to represent the same parameters, such as using different words to represent different time zones and/or using letter codes rather than numbers to represent languages. Another difference illustrated in FIG. 3 is that one user name parameter of table 300 is converted into two parameters, first name (referred to as Fname) and last name (referred to as Lname), in file 320. A table 310 of intermediate format file 122 illustrates an exemplary arrangement of the data of table 300 in accordance with an exemplary telephony vocabulary. First process 132 is adapted to convert the data from table 300 into table 310. Second process 134 converts the data from table 310 into file 320.

Dump File

Dump file 120 optionally includes a plurality of fields of raw data representing configuration values of PBX 102. The raw data comprises a listing of values organized in a specific manner, but generally without statements linking the different fields. The interpretation of the raw data is not provided with the raw data but rather is performed by a process using and/or displaying the data. The raw data may be, for example, in the form of a comma separated data file, an INI file or a relational database. The raw data does not include high level commands, such as policy statements, which need to be compiled before they are loaded into the PBX and does not include conditional statements or action commands.

The plurality of fields 301 in dump file 120 optionally belong to a plurality of field types (e.g., user name 304, time zone 306, language 308 in FIG. 3) each field type including one or more fields of the same type. For example, a field type of "User Name" 304 may include a plurality of fields 301, a field for each specific user name. In some embodiments, the number of field types is greater than the average number of fields belonging to a specific type. For example, a PBX may have more than 50 or even more than 100 configuration parameters, but not more than 20 or even not more than 10 different usernames for which the parameters may have separate values. Furthermore, the number of field types is optionally greater than the maximal number of fields belonging to a specific field type. In some embodiments, the number of field types is at least twice or even five times greater than the average or maximal number of fields of a specific type. In an exemplary embodiment, the fields of the dump file are arranged in tables and the fields belonging to a specific field type (e.g., 304, 306, 308) belong to corresponding records (e.g., 302) of a specific table. The number of tables in dump file 120 is optionally greater than the maximal number of records 302 in a specific table or is at least greater than the average number of records 302 in each table.

Intermediate Vocabulary

The generic telephone vocabulary (TPV) is optionally formed of a set of tables of configuration fields, corresponding to entities of PBXs. In some embodiments, the TPV has a relational structure. The number of tables in the TPV is optionally greater than 50 or even 100, preferably even greater than 120. In an exemplary embodiment, the TPV includes about 130 tables. Alternatively, the generic telephone vocabulary (TPV) has an object structure as used in class diagrams, for example defined by the unified modeling language (UML). Intermediate format file 122 indicates the values of configuration fields of PBXs, in relation to the tables of the TPV, which does not necessarily match a specific configuration field arrangement of a specific device.

Optionally, the generic telephone vocabulary (TPV) includes entries for configuration fields included in any of a plurality of different types of PBXs. In some embodiments, the generic telephone vocabulary (TPV) includes configuration fields which correspond to parameters not supported by at least one PBX type. Optionally, the TPV is formed as a broad common denominator for a plurality of different types of devices of different types and/or manufacturers. Typically, the TPV has more configuration fields than each of the plurality of different types of devices from which the TPV was generated. Optionally, the intermediate format file 122 is in a format which cannot be used by any of the plurality of different types of devices used in generating the TPV, without translation.

The configuration fields of the generic telephone vocabulary (TPV) optionally relate to a plurality of different aspects of the operation of PBXs, such as user configuration fields, call handling configuration fields (e.g., configuration fields of an auto attendant service), networking and/or routing configuration fields (e.g., Internet Protocol (IP) settings), physical resource configuration fields, environmental settings (e.g., time, date) and/or group communication configuration fields. Optionally, the configuration fields of the generic telephone vocabulary (TPV) relate to a plurality of different communication protocol layers, for example to both application layer and networking layer configuration fields. The configuration fields of the TPV optionally have a plurality of different data types, including for example both string and integer data type fields.

The generic telephone vocabulary (TPV) is optionally generated once, by a human user, and is then used in all future generated processes 132 and 134. Optionally, the TPV may be updated to include additional configuration fields, when a conversion into the intermediate format file 122 does not properly represent one or more fields of the source dumped file.

Conversion Processes

Processes 132 and 134, which perform conversions 206 and 212 respectively, are optionally ETL jobs generated using an ETL tool, for example PowerCenter® available from Informatica located at Redwood City, Calif. (http://www.informatica.com). As is known in the art, such tools automatically generate conversion processes from an input of source and destination formats and input indications of links between the formats.

In some embodiments, the first process 132 and the second process 134 are designed to perform translations both when field names are different and when field types, interrelations and/or any other schema definitions are different. For example, the old and new devices may use fields of different sizes to represent the same configuration field and/or a single configuration field in one format may represent a plurality of configuration fields of the other format. As another example, one format may use the value 0 for "yes", while the other uses 1 to represent "yes".

As to generating (208) the first process 132, a human user, a programmer for example, optionally loads (250) into an ETL tool a definition of the structure of data file 120 dumped out of old PBX 102, as the input structure. In some embodiments, the structure is determined by the human user from a manual of the old PBX 102 or using a dump reader supplied with the old PBX 102. Alternatively or additionally, the structure is determined by first identifying the different fields of the dumped structure and then identifying their corresponding parameters. The fields are identified, for example, by identifying the delimiters between the fields or identifying where there is a change in the type of data between adjacent bytes. For each identified field, its corresponding parameter is optionally identified according to the values of the field. Alternatively, the corresponding parameters of one or more fields are determined by changing the value of one or more fields in the dumped data of data file 120, uploading the changed data file and determining the effect of the change on old PBX 102. This process is optionally repeated for a plurality of configuration fields whose corresponding parameters were not determinable from their value content.

While it is preferred that first processes 132 be configured to convert all configuration fields of their respective dumped files 102 into the intermediary format, this is not mandatory, as even partial automatic transfer of configuration values is helpful in reducing the burden of installation. Therefore, when the deciphering of the structure of dump file 102 is difficult, first process 102 may be generated to handle only some of the configuration fields, leaving other fields for manual configuration, before or after performing the method of FIG. 2.

In generating the first process in an embodiment using the ETL tool, the structure of the generic telephone vocabulary (TPV), is loaded (252) to the ETL tool as the destination format, optionally automatically. The human user links (254) each field of the structure of old PBX 102 with the corresponding field of the TPV and then the ETL tool optionally completes (256) the generation of the first process 132, using methods known in the art.

In some embodiments, the ETL tool provides suggestions as to which fields should be linked to each other and the user selects which suggestions to use. Optionally, the ETL tool provides pairs of configuration fields from the source format and respective fields from the destination format having similar names and asks the user whether they should be linked to each other. Alternatively or additionally, the ETL tool suggests for each field of the source format respective fields of the destination format having the same data type and the user selects the field of the destination format which matches the specific field of the source format. It is noted, however, that the user may select a field not suggested by the ETL tool, for example when the corresponding fields of the source and destination formats have different data types and/or different names.

It is noted that while the use of ETL tools in generating first process 132 is convenient, the generation of first process 132 may be performed using other methods, such as direct programming in a database manipulation language, to form a process which reorders the database into the desired format.

The second process 134 is optionally generated (218) in a manner similar to the generation of first process 132. The structure of the TPV is loaded (260), preferably automatically, into the ETL tool as the input structure, and the structure of the data on new PBX 104 is loaded (262) into the ETL tool as the output structure by a human user, with indications of the fields of new PBX 104 into which the fields are to be loaded. The human user links (264) the input and output structure fields and the ETL tool generates (266) the second process 134.

As the generation of conversion processes for new devices may be labor intensive, some vendors may generate only second process 134 for a new PBX 104 just coming into service. The new second process 134 will be used with first processes 132 of old PBXs 102 being replaced by the new PBX 104. The generation of a first process 132 for the new device may be deferred to a later time when the new device becomes old and is replaced by newer devices. Alternatively, both a first process 132 converting from the format of the new PBX 104 to the TPV and a second process converting from the TPV format to the new PBX 104 are generated at the same time. When both processes 132 and 134 are available, the processes 132 and 134 may be applied to a test list of configuration values to test whether they were designed correctly. If the result of sequentially applying the process 132 and the process 134 corresponding to the PBX 104 results in the original test list, the processes are most probably correct.

In some embodiments, if a configuration field in the old device is not defined in the intermediate format, a human user may add an entry for the configuration field in the TPV. The configuration field may be added only for a specific process 132 or may be added for the use of all processes generated heretoforth. In some embodiments, if a configuration field defined by the TPV, having a value in dumped file 120, does not have a corresponding field in the new format, a warning message is generated and the configuration field is ignored. Optionally, in the first use of a newly generated process 132, a list of configuration fields of the old device for which the process was generated, which do not have corresponding configuration fields in the generic telephone vocabulary (TPV) is provided by processor 142 running the process 132. Similarly, in running a new process 134, a list of configuration fields of the generic telephone vocabulary (TPV), not supported by the second device, is provided. Alternatively or additionally, in every execution of a second process 134, a list of configuration fields of the TPV, that have non-empty values, is provided. In some embodiments, processor 142 and/or processor 144 collect statistics on the percentage of devices that support each configuration field in the generic telephone vocabulary (TPV). For each newly generated process 132 and/or 134, processor 142 and/or processor 144 provide an indication of the complexity of the corresponding devices, based on a comparison to the statistics. For example, an indication may be provided as to the percentage of a predetermined number of most used configuration fields that are not supported by a specific device. Alternatively or additionally, a list of statistically most used configuration fields which are not supported by a specific device is provided.

In some embodiments, the list of unsupported configuration fields is used during design of a PBX device, in order to determine which configuration fields have not been included in the PBX device. For example, during design of a new PBX device, before its production, a second process 134 is optionally defined for the device and a listing of configuration fields not supported by the device is received. The design of the PBX device is then corrected according to the received configuration field list and the process is repeated until all configuration fields are supported or the design is otherwise considered suitable. This process may also be performed based on a first process 132 which is used additionally or alternatively in the design process.

EXAMPLE

Following is a definition of the TPV in accordance with an exemplary embodiment. Each table is defined together with a list of its configuration fields. If not stated otherwise, the [Id] configuration field serves as the primary key of the table and is of the type not null integer. Other than the ID configuration field, each configuration field is followed by its type, wherein: INT stands for integer. CHAR stands for a single character. If followed by a number in parenthesis the configuration field is represented by that number of characters. STR stands for a string of variable length with a maximal number of characters indicated in parenthesis and if not mentioned a default of optionally 255 is used. The letters NN indicate that the configuration field cannot have a null value and the letters UNQ indicate that the value of the configuration field for each instance of the table must be unique. When followed by an equals sign "=", a default value is given.

1) CREATE TABLE [AAMainMenu] ([id], [mainMenuId] INT NN UNQ, [faxCoverage] STR NN='Disabled', [faxExtension_Extension_extension] STR, [generalMailbox_Mailbox_mailboxId] INT NN, [ttyEnabled] CHAR NN='f');
2) CREATE TABLE [AAMainMenuSchedule] ([id], [AAId_AAMainMenu_mainMenuId]INT NN, [dayOfWeek] STR NN, [isClosed] CHAR NN='t', [isTempSchedule] CHAR NN='f', [isActive] CHAR NN='f', [startTime] STR NN='00:00', [stopTime] STR NN='23:59', [useTempClosurePrompt] CHAR NN='f');
3) CREATE TABLE [AAMainMenuSelectorCode] ([id], [mainMenuId_AAMainMenu_mainMenuId] INT NN, [isClosed] CHAR NN, [selectorCode] INT NN, [selectorCodeAction] STR NN, [selectorCodeActionData] STR);
4) CREATE TABLE [AARAnalysis] ([id], [dialString] STR (18) NN, [minimumStringLength] INT, [maximumStringLength] INT, [routePattern] STR(5) NN, [callType] STR NN, [requireANI] CHAR NN='f', [isAdministrable] CHAR NN='t');
5) CREATE TABLE [AASubMenu] ([id], [subMenuId] INT NN UNIQUE, [name] STR(27) NN);
6) CREATE TABLE [AASubMenuSelectorCode] ([id], [subMenuId_AASubMenu_subMenuId] INT, [selectorCode] INT, [selectorCodeAction] STR NN='Unused', [selectorCodeActionData] STR);
7) CREATE TABLE [AbbreviatedDialGroupList] ([id], [groupListNumber] INT NN UNIQUE, [groupName] STR (64) NN UNIQUE, [extension_id] INT, [maxListSize] INT NN=150);
8) CREATE TABLE [AbbreviatedDialSystemList] ([id], [labelLanguage] STR NN='English', [maxListSize] INT NN=1000);
9) CREATE TABLE [Address] ([id], [csUser_id] INT NN, [addressType] STR NN, [street]STR NN, [localityName] STR NN, [stateOrProvince] STR NN, [postalCode] STR NN, [country] STR NN, [version] INT NN);
10) CREATE TABLE [AdminUser] ([id], [userName] STR (64) NN, [password] STR NN, [userType] STR NN='local');
11) CREATE TABLE [Announcement] ([id], [tindex] INT NN UNIQUE, [extension_id] INT NN UNQ, [announcementType] STR NN, [cOR_id] INT NN, [name] STR(64) UNQ, [queue] STR NN='n', [groupPort] CHAR(5)= '00000', [protected] CHAR NN='f');
12) CREATE TABLE [ApplicationEnablementService] ([id], [serverIDpassword] STR(26) NN, [servicePort] INT NN=13000, [extension_id] INT NN, [laesTSAPIPort] INT NN=450, [laesTLinkPort] INT NN=13001, [isActive] CHAR NN='t', [useActiveDirectoryServer] CHAR NN='f', [adsServerName] STR(64), [adsRealm] STR(64), [adsKeyTabFile] STR, [adsPort] INT=88);
13) CREATE TABLE [ARSAnalysis] ([id], [allowCallsByNonPrivilegedUsers] CHAR='f', [dialString] STR(64)

NN, [minimumStringLength] INT NN, [maximumStringLength] INT NN, [routePattern] STR(64) NN, [callType] STR NN='locl', [requireANI] CHAR NN='f', [isToll] CHAR NN='f');

14) CREATE TABLE [ArsDigitConversion] ([id], [matchingPattern] STR(18) NN, [minimumStringLength] INT NN, [maximumStringLength] INT NN, [deletedDigits] INT NN=0, [replacementString] STR(64)=", [network] STR(64) NN='ext', [conv] CHAR NN='f');

15) CREATE TABLE [AuthorizationCode] ([id], [csUser_id] INT, [AuthorizationCode] STR(64) NN UNIQUE, [PrivilegeLevel] STR NN='0');

16) CREATE TABLE [BRIPort] ([id], [briTrunkBoard_id] INT NN, [tindex] INT NN, [interface] STR='user', [countryPeerProtocol] STR NN='1', [layer1Stable] CHAR NN='t', [detectSlips] CHAR NN='f', [interworkingMessage] STR NN='PROGress', [xIDTest] CHAR NN='f', [tei] STR NN='0', [endptInit] CHAR NN='f', [sPID1] STR(12), [endptID1] STR(2), [sPID2] STR(12), [endptID2] STR(2), [directoryNumber1] STR(10), [directoryNumber2] STR(10));

17) CREATE TABLE [BRITrunkBoard] ([id], [location] STR(5) NN UNIQUE, [name] STR(15), [interfaceCompanding] STR NN='mu-law', [dCPAnalogBearerCapability] STR NN='3.1 khZ', [t3 TimerLength] INT NN=15);

18) CREATE TABLE [CallClassification] ([id], [globalClassificationAdjustment] INT NN=0, [usaDefaultAlgorithm] CHAR NN='t', [globalBusyToneDetectionAdj] INT NN=0);

19) CREATE TABLE [CallDetailRecording] ([id], [cdrDateFormat] STR NN, [primaryOutputEndpoint] STR NN='CDR1', [primaryOutputFormat] STR, [privacyDigitstoHide] INT=0, [remoteIPAddr] STR, [cDRPort] INT=9000, [reliableProtocol] CHAR NN='t', [packetRespTimer] INT NN==30, [sessionConnectMessageCounter] INT NN==3, [spduCounter] INT=3, [connectivityTimer] INT NN=60, [cDRAccountCodeLength] INT NN=8);

20) CREATE TABLE [CallingPermission] ([id], [cOR_id] INT, [tindex] INT, [permission] CHAR NN='t');

21) CREATE TABLE [CamaNumbering] ([id], [extensionLength] INT, [extensionLeadingDigits] STR(64) NN, [cESID] STR(16), [totalLength] INT);

22) CREATE TABLE [CertificateRequestSubjectName] ([commonName] STR, [organizationalUnit] STR, [organization] STR, [country] STR, [locality] STR, [selfSignedCertificateLifetimeFrom] STR, [selfSignedCertificateLifetimeTo] STR);

23) CREATE TABLE [CertificateThumbprints] ([certificateOf] STR NN UNIQUE, [communityString] STR);

24) CREATE TABLE [ClassOfRestriction] ([id], [cORIndex] INT UNIQUE, [cORDescription] STR(35), [aPLT] CHAR='t', [accessToMCT] CHAR NN='t', [automaticChargeDisplay] CHAR NN='f', [blockEnhancedConferenceTransfer] CHAR NN='f', [blockTransferDisplay] CHAR NN='t', [brazilCollectCallBlocking] CHAR NN='f', [calledPartyRestriction] STR NN='none', [callingPartyRestriction] STR NN='none', [canBeAServiceObserver] CHAR NN='t', [canBePickedUpByDirectedCallPickup] CHAR='f', [canBeServiceObserved] CHAR NN='f', [canChangeCallCoverage] CHAR NN='f', [canUseDirectedCallPickup] CHAR NN='f', [directAgentCalling] CHAR NN='f', [fRL] INT NN=0, [facilityAccessTrunkTest] CHAR NN='f', [fullyRestrictedService] CHAR NN='f', [groupIICategoryForMFC] INT NN=7, [hearSyntheticMusicOnHold] CHAR NN='f', [mFIncomingCallTrace] CHAR NN='f', [displayPBXDataOnPhone] CHAR NN='f', [partitionedGroupNumber] INT NN=1, [priorityQueueing] CHAR NN='f', [remoteLogoutOfAgent] CHAR NN='f', [restrictedCallList] CHAR NN='f', [restrictedOverride] STR NN, [sendANIForMFE] CHAR NN='f', [stationLockCOR_id] INT NN=5);

25) CREATE TABLE [ClassOfService] ([id], [cOSIndex] INT NN UNIQUE, [autoCallback] CHAR NN='f', [callFwdAllCalls] CHAR NN='f', [dataPrivacy] CHAR NN='f', [priorityAndVoiceAnnounceCalling] CHAR NN='f', [consolePermissions] CHAR NN='f', [offhookAlert] CHAR NN='f', [clientRoom] CHAR NN='f', [restrictCallFwdOffset] CHAR NN='f', [callFwdBusyDontAnswer] CHAR NN='f', [personalstationAccess] CHAR NN='f', [extendedFwdAll] CHAR NN='f', [extendedFwdBusyNoAnswer] CHAR NN='f', [trkToTrkTransferOverride] CHAR NN='f', [qSIGCallOfferOriginations] CHAR NN='f', [contactClosureActivation] CHAR NN='f', [vIPCaller] CHAR NN='f', [automaticExclusion] CHAR NN='f');

26) CREATE TABLE [CollectiveRingingGroup] ([id], [groupNumber] INT NN UNIQUE, [displayName] STR, [displayNameScriptTag] STR(8)='00000003', [displayNameASCII] STR NN UNIQUE);

27) CREATE TABLE [ContactClosures] ([contactClosureId] STR NN UNIQUE, [contactClosureAdmin] STR='mgc', [contactClosurePulseDurationSeconds] INT=3, [description] STR);

28) CREATE TABLE [CountryName2Code] ([id], [countryName] STR(100), [countryCode] INT NN, [compandingMode] STR);

29) CREATE TABLE [CoverageAnswerGroup] ([id], [coverageAnswerGroupNumber] INT NN UNQ, [name] STR (64) NN UNQ);

30) CREATE TABLE [CoverageAnswerGroupMember] ([id] INT, [coverageAnswerGroup_id] INT, [tindex] INT, [extension_id] INT);

31) CREATE TABLE [CoveragePath] ([id], [coveragePathNumber] INT NN UNIQUE, [name] STR(64) NN, [huntAfterCoverage] CHAR NN='f', [coveragePath_id] INT, [isExternal] CHAR NN='f', [initialRings] INT NN=0, [isAdministrable] CHAR NN='t', [coveragePathType] STR NN='regularCP');

32) CREATE TABLE [CoveragePoint] ([id], [coveragePath_id] INT NN, [tindex] INT NN, [extensionHuntGroupOrRemoteCoverPath_choice] STR NN='extension_id', [extension_id] INT, [huntGroup_id] INT, [coverageAnswerGroup_id] INT, [remoteCoverPath] STR(64), [rings] INT=2);

33) CREATE TABLE [CsGroup] ([id], [businessCategory] STR, [commonName] STR, [effectiveTime] CHAR(100), [name] STR NN UNQ, [isUserDefined] CHAR NN='f', [updateTime] CHAR(100) NN, [version] INT NN); CREATE UNIQUE INDEX [sqlite_autoindex_CsGroup_1] ON [CsGroup] ([name]);

34) CREATE TABLE [CsUser] ([id] AUTOINCREMENT, [userid] STR NN UNIQUE, [userPassword] STR, [stationPassword] STR, [authenticationType] STR='Basic', [description] STR, [givenName] STR, [middleName] STR, [surName] STR, [displayName] STR, [displayNameScriptTag] STR(8)='00000003', [displayNameASCII] STR NN, [preferredLanguage] STR NN, [suffix] STR, [effectiveTime] CHAR(100), [updateTime] CHAR(100) NN, [version] INT NN);

35) CREATE TABLE [DataModelInfo] ([id], [versionNumber] STR(64) NN);

36) CREATE TABLE [DaylightSavingRule] ([id], [tindex] INT NN UNQ, [startDay] STR NN, [startMonth] STR NN, [startDate] INT, [startHour] INT, [startMinute] INT, [IncrementHour] INT, [IncrementMinute] INT, [stopDay] STR NN, [stopMonth] STR NN, [stopDate] INT, [stopHour] INT, [stopMinute] INT);

37) CREATE TABLE [DhcpPool] ([id], [poolIndex] INT NN UNQ, [poolName] STR, [startIpAddr] STR, [endIpAddr] STR, [leaseTime] INT=691200, [subnetMask] STR='255.255.255.0', [domainName] STR(40), [activatePool] CHAR='f', [defaultRouter] STR, [dnsServer] STR, [smtpServer] STR, [sipServer] STR, [tftpServer] STR, [ssonStatus] STR='disabled', [ssonString] STR, [sntpServer] STR(128));

38) CREATE TABLE [DhcpPoolUserDefinedOptions] ([id], [dhcpPool_id] INT NN, [optionNumber] INT NN, [optionName] STR(31), [optionType] STR, [optionValue] STR NN);

39) CREATE TABLE [DhcpServerSystemParams] ([id], [ipDhcpPingPacket] CHAR NN='f', [ipDhcpPingTimeout] INT=500);

40) CREATE TABLE [DialInConfig] ([isEnabled] CHAR NN='t', [dialInAuthenticationMethod] STR='RAS', [initString] STR='AT S7=45 S0=2 L1 V1 X4 &c1 E0 Q0', [userName] STR(32), [password] STR, [ipAddress] STR);

41) CREATE TABLE [DialOutConfig] ([isEnabled] CHAR NN='f', [atCmdString1] STR, [atCmdString2] STR, [atCmdString3] STR, [ispUserName] STR, [ispPassword] STR, [idle] INT=60);

42) CREATE TABLE [DialPlanAnalysisEntry] ([id], [dialedString] STR(4) NN, [totalLength] INT NN, [callType] STR NN);

43) CREATE TABLE [DocmConnectivity] ([id], [clientID] STR UNIQUE, [notificationAddress] STR, [userName] STR, [password] STR, [syncToken] INT, [version] STR);

44) CREATE TABLE [DS1CircuitPack] ([id], [location] STR(5) UNIQUE, [name] STR(15), [lineCoding] STR NN='b8zs', [interfaceCompanding] STR NN='mulaw', [idleCode] STR(8)='11111111', [slipDetection] CHAR NN='t', [bitRate] STR NN, [lineCompensation] INT=1, [framingMode] STR NN='esf', [sendANSIPerformanceReports] CHAR NN='f', [farEndCSUAddress] STR NN='b', [signalingMode] STR NN='isdn-pri', [connectType] STR NN='network', [interworkingMessage] STR NN='PROGress', [protocolVersion] STR='a', [cRC] CHAR NN='f', [tNC7LongTimers] CHAR NN='f', [dCPAnalogBearerCapablity] STR NN='3.1 kHz', [t303 Timer] INT NN=4, [countryPeerProtocol] STR='1', [interconnect] CHAR (2)='CO', [echoCancellation] CHAR NN='f', [echoCancellationDirection] STR NN, [echoCancellationConfiguration] STR='4', [cSUType] STR NN, [transmitLBO] STR NN='0db', [receiveALBO] STR NN='26 db', [uponDTELOS] STR NN='loopback', [supplyCPELoopback] CHAR NN='f');

45) CREATE TABLE [EmailSmtpServer] ([id], [senderEmailAddress] STR NN='admin@domain', [serverLocation] STR NN='Locate using DNS', [serverAddress] STR, [serverPort] INT=25, [useSecureConnection] CHAR NN='f', [useAuthentication] CHAR NN='f', [accountName] STR, [password] STR);

46) CREATE TABLE [Enumeration] ([enumName] STR NN, [enumValue] STR NN, [enumLabelEn] STR NN, [enumOrder] INT NN, CONSTRAINT [sqlite_autoindex_Enumeration_1] PRIMARY KEY ([enumName], [enumValue]));

47) CREATE TABLE [Etr] ([module] INT NN, [mode] STR='auto');

48) CREATE TABLE [Extension] ([id], [extension] STR(7) NN UNIQUE, [hasMailbox] STR NN='none');

49) CREATE TABLE [ExtensionToCellular] ([id], [station_id] INT NN, [phoneNumber] STR(64) UNQ, [dialPrefix] STR(4));

50) CREATE TABLE [FeatureAccessCode] ([id], [dialCode] STR(4) UNIQUE, [featureCode] STR NN UNIQUE);

51) CREATE TABLE [FeatureNameExtension] ([id], [extension_id] INT UNIQUE, [featureNameExtensionCode] STR NN UNIQUE);

52) CREATE TABLE [GeneralL2App] ([id], [portRedundancyMinTimeBetweenSwichOverSeconds] INT NN=60, [portRedundancySwitchBackIntervalSeconds] STR NN='none', [poeTrap] STR NN='enable', [poeThreshold] INT=99, [mssNotificationRateSeconds] INT NN=300, [lldpMessageTxIntervalSeconds] INT NN=30, [lldpMessageTxHoldMultiplier] INT NN=4, [lldpReInitDelaySeconds] INT NN=2, [lldpTxDelaySeconds] INT NN=2, [dot1MaxReq] INT=2, [dot1xPortMode] STR NN='portBasedAuthentication', [dot1xQuietPeriodSeconds] INT=60, [dot1xReAuthPeriodSeconds] INT=3600, [dot1xServerTimeoutSeconds] INT=30, [dot1xSuppTimeoutSeconds] INT=30, [dot1xReAuthentication] STR NN='disable', [dot1xSystemAuthControl] STR NN='disable', [dot1xPortsTxPeriodSeconds] INT=30, [lldpSystemControlStatus] STR NN='enable');

53) CREATE TABLE [GeneralPlatformProperties] ([systemName] STR, [systemLocation] STR, [systemContact] STR, [hostname] STR NN, [isAutoDstChangesEnabled] CHAR NN='t', [isAutoNtpSyncEnabled] CHAR NN='f', [countryCode] STR='1', [systemScriptTag] STR NN='00000003', [countryName] STR='United States');

54) CREATE TABLE [GeneralSecurityParameters] ([loginAccountLockoutAttemptCount] INT NN=5, [loginAccountLockoutAttemptIntervalSeconds] INT NN=180, [businessPartnerAccess] STR NN, [loginMinAdminPasswordLength] INT=8, [minExtentionVMBoxPINLength] INT=6, [enableAvayaGlobalServicesUsers] CHAR NN='t', [remoteAdminAuthMode] STR NN='Disabled');

55) CREATE TABLE [GroupDialCode] ([id], [dialCodeLabel] STR(13) NN='Dial Code nn', [abbreviatedDialGroupList_id] INT NN, [tindex] INT, [dialCodeString] STR (24));

56) CREATE TABLE [GroupPaging] ([id], [groupNumber] INT NN UNIQUE, [extension_id] INT NN, [groupName] STR(28), [cOR_id] INT NN==1);

57) CREATE TABLE [GroupPagingMember] ([id], [groupPaging_id] INT NN, [tindex] INT NN, [extensionOrTAC_choice] STR NN='extension_id', [extension_id] INT, [tac] STR(4));

58) CREATE TABLE [H323 SecurityProfile] ([id], [ipNetworkRegion_id] INT, [tindex] INT NN, [profile] STR (10));

59) CREATE TABLE [Handle] ([id], [csUser_id] INT NN, [handle] STR, [handleT] STR, [version] INT NN);

60) CREATE TABLE [HttpClientConfig] ([isProxyEnabled] CHAR NN, [httpsProxyAddress] STR NN, [httpsProxyPort] INT=443);

61) CREATE TABLE [HuntGroup] ([id], [huntGroupNumber] INT NN UNIQUE, [name] STR(27) NN UNIQUE, [name2] STR(27), [name2ScriptTag] STR(8)= '00000003', [groupNameExtension_id] INT NN, [huntGroupType] STR NN='ucd-mia', [cOR_id] INT NN=1, [securityCode] INT, [iSDN_SIPCallDisplay] STR, [aCD] CHAR NN='f', [queue] CHAR NN='t', [coveragePath] STR (4), [messageCenter] STR NN='none', [voiceMailNumber] STR(17), [pilotNumber] STR(17), [voiceMailHandle] STR(17), [routingDigits] STR(4), [isAdministrable] CHAR NN='t', [firstAnnouncementExtension] INT, [announcementDelay] INT);

62) CREATE TABLE [HuntGroupMember] ([id], [huntGroup_id] INT NN, [tindex] INT NN, [extension_id] INT NN);

63) CREATE TABLE [IncomingBackwardSignalTypesGroup_A] ([id], [signalNumber] INT, [signalType] STR, [countryName] STR);

64) CREATE TABLE [IncomingBackwardSignalTypesGroup_B] ([id], [signalNumber] INT, [signalType] STR, [countryName] STR);

65) CREATE TABLE [IncomingCallHandlingTreatment] ([id], [trunkGroup_id] INT NN, [calledLen] INT NN, [calledNumber] STR(16) NN, [extensionOrDigits_choice] STR NN='digits', [extension_id] INT, [deleteDigit] STR(10), [insertDigits] STR(10), [perCallPCNBN] STR);

66) CREATE TABLE [IncomingForwardSignalTypesGroup_I] ([id], [signalNumber] INT, [signalType] STR='ignored', [countryName] STR NN);

67) CREATE TABLE [IncomingForwardSignalTypesGroup_II] ([id], [signalNumber] INT, [signalType] STR='normal', [countryName] STR NN);

68) CREATE TABLE [IntercomGroup] ([id], [groupNumber] INT NN UNIQUE, [groupName] STR(17), [dialCodeLength] INT);

69) CREATE TABLE [IntercomGroupMember] ([id], [intercomGroup_id] INT NN, [tindex] INT NN, [extension_id] INT NN, [dialCode] STR(2));

70) CREATE TABLE [InterNetworkRegion] ([id], [ipNetworkRegion_id] INT NN, [tindex] INT NN, [codecSET] STR(10));

71) CREATE TABLE [IPCodecSet] ([id], [ipCodecSetNumber] INT UNQ, [faxMode] STR NN='t.38-standard', [faxRedundancy] INT=0, [mediaEncryptionSecurity_id] INT NN, [modemMode] STR NN, [modemRedundancy] INT=0, [tDD_TTYMode] STR NN, [tDD_TTYRedundancy] INT NN=0, [clearChannelMode] CHAR NN='f', [clearChannelRedundancy] INT=0);

72) CREATE TABLE [IPCodecSetMember] ([id], [ipCodecSet_id] INT NN, [tindex] INT NN, [audioCodec] STR NN, [silenceSuppression] CHAR NN='f', [framesPerPacket] INT=2);

73) CREATE TABLE [IPConfigSet] ([id], [configurationSetNumber] INT NN UNQ=2, [cellularVoiceMailDetection] STR NN='timed');

74) CREATE TABLE [IPInterfacesOverVlans] ([id], [ipAddr] STR, [subnetMask] INT, [vlanId] INT);

75) CREATE TABLE [IPNetworkRegion] ([id], [regionNumber] INT UNIQUE, [authoritativeDomain] STR(40) NN, [codecSet] INT, [uDPPortMin] INT, [uDPPortMax] INT, [1E802CallControlPriority] INT NN=6, [1E802AudioPriority] INT NN=6, [callControlPHBValue] INT NN=46, [audioPHBValue] INT NN=46, [iPAudioHairpin] CHAR NN='f', [allowSipURIConversion] CHAR NN='t');

76) CREATE TABLE [L2Port] ([id], [portNumber] INT NN, [moduleNumber] INT NN, [portName] STR NN, [adminStatus] STR NN='enable', [pvid_L2Vlan_vlanId] INT NN=1, [vlanBindingMode] STR NN='static', [trunkMode] STR NN='off', [level] INT NN=0, [autoNegMode] STR NN='enable', [duplexMode] STR NN='full', [speed] STR NN='100', [flowcontrolMode] STR NN='off', [autonegFcAdvr] STR NN='no-flowcontrol', [trap] STR NN='disable', [type] STR, [classification] STR NN='regular', [stpStatus] STR NN='disable', [stpP2pAdminStatus] STR NN='auto', [stpEdgeAdminState] STR NN='edge-port', [stpIsForceprotocolMigration] CHAR='f', [stpPriority] INT=128, [stpCost] STR, [maxReq] INT NN=2, [dot1xPortControl] STR NN='auto', [dot1xPortMode] STR NN='portBasedAuthentication', [dot1xQuietPeriodSeconds] INT=60, [dot1xReAuthPeriodSeconds] INT=3600, [dot1xServerTimeoutSeconds] INT=30, [dot1xSuppTimeoutSeconds] INT=30, [dot1xTxPeriodSeconds] INT=30, [dot1xPortInitialize] CHAR NN='f', [lldpStatus] STR NN='disable', [lldpTlvDescription] STR NN='disable', [lldpTlvSysName] STR NN='disable', [lldpTlvSysDescription] STR NN='disable', [lldpTlvSysCapabilities] STR NN='disable', [lldpTlvPvid] STR NN='disable', [lldpTlvVlanName] STR='vlan1', [lldpTlvManagmentAddr] STR NN='disable', [poeState] STR NN='enable', [poePriority] STR NN='Low', [poeType] STR='telephone');

77) CREATE TABLE [L2PortMirror] ([id], [srcPort_L2Port_id] INT NN UNIQUE, [destPort_L2Port_id] INT NN UNIQUE, [direction] STR NN, [isEnabled] CHAR NN='f');

78) CREATE TABLE [L2PortRedundancy] ([id], [primaryPort_L2Port_id] INT NN UNIQUE, [secondaryPort_L2Port_id] INT NN UNIQUE, [name] STR NN, [mode] STR NN);

79) CREATE TABLE [L2PortStaticVlanMapping] ([port_L2Port_id] INT NN, [vlan_L2Vlan_vlanId] INT NN);

80) CREATE TABLE [L2Vlan] ([vlanId], [vlanName] STR NN UNQ);

81) CREATE TABLE [LcmUser] ([userName] STR NN, [Password] STR NN);

82) CREATE TABLE [LdapClientConfig] ([id], [isServerEnabled] CHAR NN='f', [serverAddress] STR (256) NN, [baseDN] STR (256) NN, [bindDN] STR (256), [bindSecret] STR (256), [ldapPort] INT=389);

83) CREATE TABLE [LocationParameter] ([id], [analogLineTransmission] STR NN='1', [analogRingingCadence] STR NN='1', [compandingMode] STR NN='Mu-Law', [flashhookInterval] CHAR NN='t', [forwardDisconnectTimer] INT NN=600, [lowerBound] INT NN=200, [upperBound] INT NN=1000, [twoPartyLossPlan] STR NN='1', [toneLossPlan] STR NN='1', [customizeTwoPartyLossPlan] CHAR NN='t');

84) CREATE TABLE [LvmSystemProperties] ([id], [languageMode] STR NN='Monolingual', [primaryLanguage] STR NN='language1', [secondaryLanguage] STR NN='language2', [language1TtyEnabled] CHAR NN='f', [language2TtyEnabled] CHAR NN='f', [minPasswordLengthChars] INT NN=4, [broadcastAgingTime] INT NN=14, [csidNameFormat] STR NN='Disabled', [organizationName] STR);

85) CREATE TABLE [Mailbox] ([id], [mailboxId] INT NN UNQ, [mailboxType] STR NN='Regular', [emailAddress] STR, [broadcastingPermitted] CHAR='f', [outcallingPermitted]CHAR NN='f', [passwordChangePermitted] CHAR NN='t', [ttyEnabled] CHAR NN='f', [isGeneralMailbox] CHAR NN='f', [ownerExtension_Extension_extension] STR);

86) CREATE TABLE [MaliciousCallTraceGroupExtension] ([id], [tindex] INT NN UNIQUE, [extension_id] INT NN UNIQUE);

87) CREATE TABLE [MediaEncryptionSecurity] ([id], [securityLevel] STR NN UNIQUE='Notpreferred', [mediaEncryption1] STR NN, [mediaEncryption2] STR, [mediaEncryption3] STR);

88) CREATE TABLE [MediaGateway] ([id], [number] INT UNIQUE=1, [gatewayType] STR NN='g250', [gatewayName] STR(20), [gatewaySerialNo] STR(12));

89) CREATE TABLE [MediaGatewayModule] ([id], [mediaGateway_id] INT NN, [slot] INT NN, [moduleType] STR NN='gateway-announcements', [isAdministrable] CHAR NN='f', [hwVintage] STR, [configured] STR='f', [isAWOH] CHAR NN='f', [inConflict] CHAR NN='f');

90) CREATE TABLE [MediaGatewayModulePort] ([id], [module_MediaGatewayModule_id] INT NN, [port] INT NN, [portType] STR NN, [usedFor] STR, [usedBy] STR);

91) CREATE TABLE [MultiFrequencySignaling] ([id], [incomingCallType] STR NN='group-ii-mfc', [outgoingCallType] STR NN='group-ii-mfc', [maximumResendRequests] INT, [receivedSignalGaindB] INT=0, [transmittedSignalGaindB] INT NN, [ANIPrefix] STR, [DefaultANI] STR, [nextANIDigitIncoming] STR, [nextANIDigitOutgoing]STR NN, [requestIncomingANInonAARARS] CHAR NN='t', [outgoingForwardSignalPresentTimersec] INT NN, [outgoingForwardSignalAbsentTimersec] INT NN=30, [MFSignalingInterceptTreatmentIncoming] CHAR NN, [MFSignalingInterceptTreatmentOutgoing] STR NN, [collectAllDigitsBeforeSeizure] CHAR NN, [overlapSendingonLinktoLinkTandemCalls] CHAR NN='f', [groupIICalledPartyCategory] STR NN, [requestCallCategoryatStartofCall] CHAR NN, [numberofIncomingANIDigits] INT NN, [numberofoutgoingANIDigits] INT NN, [truncateStationNumberinANI] STR NN='', [addressDigitsIncludeEndofdigitsSignal] CHAR NN='f', [requestCPNatStartofCall] CHAR NN='f', [doNotSendGroupBSignalstoCO] CHAR NN='f', [ANISourceforForwardedCoveredCalls] STR NN='caller', [incomingANIAvailable]INT, [outgoingANIAvailable] INT, [incomingANINotAvailable] INT, [outgoingANINotAvailable] INT, [countryName] STR, [outgoingAnnouncement] INT);

92) CREATE TABLE [MusicOnHoldAnalogGroup] ([id], [mohGroupNumber] INT UNIQUE, [mohGroupName] STR(64));

93) CREATE TABLE [MusicOnHoldSourceLocation] ([id], [musicOnHoldAnalogGroup_id] INT NN, [tindex] INT NN, [sourceLocation] CHAR(7));

94) CREATE TABLE [NetworkServicesDnsclientDomainName] ([tindex], [domainName] STR(40) NN UNIQUE);

95) CREATE TABLE [NetworkServicesDnsClientGeneralConfig] ([timeoutSeconds] INT NN);

96) CREATE TABLE [NetworkServicesDnsClientNameServer] ([tindex], [nameServer] STR NN UNIQUE);

97) CREATE TABLE [NetworkServicesNtpClientServersList] ([tindex], [ntpServer] STR NN UNIQUE);

98) CREATE TABLE [NetworkServicesStatus] ([isDhcpEnabled] CHAR NN='f', [isTelnetEnabled] CHAR NN='f', [isSshEnabled] CHAR NN='t', [isNtpServerEnabled] CHAR NN='f');

99) CREATE TABLE [NetworkServicesTelnetServerStatus] ([isEnabled] CHAR NN='f');

100) CREATE TABLE [OutwardBackwardSignalTypesGroup_A] ([id], [signalNumber] INT, [signalType] STR='congestion', [countryName] STR NN);

101) CREATE TABLE [OutwardBackwardSignalTypesGroup_B] ([id], [signalNumber] INT, [signalType] STR='congestion', [countryName] STR NN);

102) CREATE TABLE [OutwardForwardSignalTypesGroup_I] ([id], [signalNumber] INT, [signalType] STR, [countryName] STR);

103) CREATE TABLE [OutwardForwardSignalTypesGroup_II] ([id], [signalNumber] INT, [signalType] STR, [countryName] STR);

104) CREATE TABLE [PartitionRouteTable] ([id], [routeIndex] INT NN, [partitionGroupNumber] INT NN, [routePattern] STR(4) NN);

105) CREATE TABLE [PersonalCOLine] ([id], [pcolGroupNumber] INT UNIQUE, [pcolGroupType] STR NN, [pcolGroupName] STR(27) NN, [tAC] STR(4) NN, [coveragePath] STR(4), [outgoingDisplay] CHAR NN='f', [dataRestriction] CHAR NN='f', [owned] CHAR NN='f', [ownersExtension] INT, [pcolTrunkType] STR='loopstart', [pcolTrunkPort] STR(7) NN, [name] STR(10), [serviceType] STR='public-ntwk', [pcolOutgoingDialType] STR NN='tone', [prefix1] CHAR='t', [disconnectSupervisionIn] CHAR='t', [disconnectSupervisionOut] CHAR='f', [answerSupervisionTimeout] INT=10, [trunkGain] STR NN='high', [chargeConversion] INT=1, [decimalPoint] STR NN='none', [currencySymbol] STR(4)='high', [chargeType] STR(7)='units', [direction] STR NN='two-way', [disconnectTimingMsec] INT=500, [trunkTermination] STR NN='rc', [callStillHeld] CHAR NN='f', [receiveAnswerSupervision] CHAR NN='f', [country] STR='1', [chargeAdvice] STR NN='none', [codesetToSendDisplay] STR NN='6', [codesetToSendNationalIEs] STR NN='6', [supplementaryServiceProtocol] STR NN='a', [digitHandlingInOut] STR NN='overlap/overlap', [sendName] STR NN='n', [sendCallingNumber] STR NN='r', [suppressPoundOutPulsing] CHAR NN='f', [sendConnectedNumber] STR NN='n', [networkJapaneseConnectBefore] CHAR NN='f', [applyLocalRingback] CHAR NN='f', [receiveAnalogIncomingCallID] STR NN='disabled', [perCallCPNBlockingCode] STR(4), [incomingGlareMsec] INT=1500, [ringingMonitorMsec] INT NN=5200, [outgoingEndOfDialSec] INT NN=10, [programmedDialPauseMsec] INT NN=1500, [flashLengthMsec] INT NN=2000, [outgoingDialGuardMsec] INT NN=1600, [outgoingGlareGuardMsec] INT NN=1500, [outgoingRotaryInterdigitMsec] INT NN=800, [incomingSeizureMsec] INT NN=500, [outgoingSeizureResponseSec] INT NN=5, [toneMsec] INT NN=350, [pauseMsec] INT NN=150, [outpulsePPS] CHAR(2) NN='10', [outpulseMakeMsec] INT NN=40, [outpulseBreakMsec] INT NN=60, [outpulsePPM] CHAR NN='f', [analogLossGroup] INT, [digitalLossGroup] INT, [busyToneDisconnect] CHAR='f');

106) CREATE TABLE [PickupGroup] ([id], [groupNumber] INT NN UNIQUE, [groupName] STR(15) NN);

107) CREATE TABLE [PickupGroupMember] ([id], [pickupGroup_id] INT NN, [tindex] INT NN, [extension_id] INT NN);

108) CREATE TABLE [Property] ([id], [propertyContainer_id] INT NN, [name] STR UNQ, [type] STR, [value] STR, [version] INT NN);

109) CREATE TABLE [PropertyContainer] ([id], [csUser_id] INT NN, [name] STR UNIQUE, [type] STR, [category] STR, [version] INT NN);

110) CREATE TABLE [ProvSipTrunk] ([id], [replaceOutgoingRequestUriDomain] CHAR NN='f', [fastSeqForkingTimeoutMsec] INT=2000, [fastSeqForkingMaxSearch- TimeMsec] INT=6000, [healthChecksMode] STR, [healthChecksDownIntervalMsec] INT=10000, [healthChecksUpIntervalMsec] INT=60000, [healthChecksDownThreshold] INT=3, [healthChecksUpThreshold] INT=2, [didRegistration] STR, [dnsRetryIntervalMsec] INT=50000, [dnsMinRefreshIntervalMsec] INT, [dnsRefreshTtl] INT);

111) CREATE TABLE [ProvSipTrunkPeer] ([id], [provSipTrunk_id] INT NN, [peerAddress_choice] STR NN='IPv4', [peerIp4Address] STR, [peerFqdn] STR, [peerTransport] STR NN='UDP', [peerPort] INT, [priority] INT=100, [limitIndex] INT NN);

112) CREATE TABLE [PublicUnknownNumberingTable] ([id], [extensionLength] INT NN=0, [extensionLeadingDigits] STR(7) NN, [trunkGroupIndicator] STR(9), [cpnPrefix] STR(15), [cpnLength] INT NN=0, [type] STR NN='public');

113) CREATE TABLE [RadiusClientConfig] ([udpPort] INT NN=1812, [sharedSecret] STR NN, [retryNumber] INT NN=4, [retrytimeSeconds] INT NN=5, [failRecoveryTimeoutSeconds] INT NN);

114) CREATE TABLE [RadiusClientServersList] ([tindex], [isEnabled] CHAR NN='f', [server] STR NN UNIQUE);

115) CREATE TABLE [Role] ([id], [businessCategory] STR, [commonName] STR, [effectiveTime] CHAR(100), [name] STR NN UNQ, [isOperational] CHAR NN='f', [updateTime] CHAR(100) NN, [version] INT NN);

116) CREATE TABLE [RoutePattern] ([id], [patternNumber] INT UNIQUE, [patternName] STR(27) NN UNQ, [sCCAN] CHAR NN='f', [secureSIP] CHAR NN='f');

117) CREATE TABLE [RoutePatternEntry] ([id], [routePattern_id] INT NN, [tindex] INT NN, [trunkGroupOrPCOL_choice] STR NN='trunkGroup_id', [trunkGroup_id] INT, [pcol] STR(1), [frl] INT=0, [npa] STR(3), [pfxMrk] CHAR, [hopLimit] STR(2), [tollList] STR(2), [numberDeletedDigits] INT=0, [insertedDigits] STR(36), [dCS_QSIGIntw] CHAR NN='f', [iXC] STR(4)='user', [LAR] NN='none');

118) CREATE TABLE [SBIPInterface] ([id], [ipAddr] STR NN);

119) CREATE TABLE [SecurityViolationNotification] ([id], [SVNAuthorizationCodeViolationNotification] CHAR NN='f', [SVNAuthorizationCodeReferralDestination] INT, [SVNAuthorizationCodeOriginatingExtension] INT, [SVNAuthorizationCodeThreshold] INT=5, [SVNAuthorizationCodeTimeIntervalMinutes] INT=2, [SVNAuthorizationCodeTimeIntervalSeconds] INT=0, [SVNAuthorizationCodeAnnouncementExtension] INT);

120) CREATE TABLE [SignalingGroup] ([id], [groupNumber] INT UNQ, [groupType] STR NN, [trunkGroupChannelSelection_id] INT, [nearEndNodeName] STR, [nearEndListenPort] STR(4)='6004', [farEndNodeName] STR, [farEndListenPort] INT, [farEndDomain] STR(40), [farEndNetworkRegion] INT, [primaryDChannel] STR(7), [directIPIPAudioConnections] CHAR NN='t', [dTMFOverIP] STR NN='out-of-band', [transportMethod] STR NN='tls', [sessionEstablishmentTimer] INT=3, [xmobilityWirelessType] STR, [provSipTrunk_id] INT, [nearEndDomain] STR(40));

121) CREATE TABLE [SnmpCommunity] ([communityType] STR NN UNIQUE, [adminState] STR='disable', [communityString] STR);

122) CREATE TABLE [SnmpServerStatus] ([adminState] STR='disable', [v1 Admin State] STR='disable');

123) CREATE TABLE [SnmpV3Manager] ([id], [hostAddress] STR NN, [destUdpPort] INT NN=162, [secModel] STR NN='v1', [level] STR NN='authPriv', [notificationList_SnmpV3ManagerNotificationListFilter_id] INT NN UNIQUE, [notificationType] STR NN='trap', [userName] STR NN, [communityString] STR NN);

124) CREATE TABLE [SnmpV3ManagerNotificationListFilter] ([id], [config] CHAR NN='t', [dhcpClients] CHAR NN='t', [dhcpServer] CHAR NN='t', [ethPortFaults] CHAR NN='t', [filesys] CHAR NN='t', [generic] CHAR NN='t', [hardware] CHAR NN='t', [l3Events]CHAR NN='t', [linkFaults] CHAR NN='t', [mediaGateway] CHAR NN='t', [rmon] CHAR NN='t', [security] CHAR NN='t', [swRedundancy] CHAR NN='t', [tftpServer] CHAR NN='t');

125) CREATE TABLE [SnmpV3User] ([id], [userName] STR NN, [userGroup] STR NN, [authenticationMethod] STR NN='SHA', [authenticationPassword] STR, [encryptionMethod] STR='DES', [encryptionPassword] STR, [remoteEngineID] STR);

126) CREATE TABLE [StaticRoutes] ([id], [ipAddr] STR, [gw] STR, [subnetMask] INT);

127) CREATE TABLE [Station] ([id], [extension_id] INT NN UNIQUE, [csUser_id] INT, [stationType_id] INT NN, [port] STR(7), [cOR_id] INT NN, [cOS_id] INT NN, [audibleMessageWaiting] CHAR NN='f', [autoSelectAnyIdleAppearance] CHAR NN='f', [bridgedCallAlerting] CHAR NN='t', [coveragePath1] STR(4), [dataRestriction] CHAR NN='f', [displayLanguage] STR NN, [hotLineADListNumber] INT, [hotLineDialCode] STR(4), [idleAppearance] CHAR='f', [bridgedIdleLinePreference] CHAR NN='f', [ipSoftphone] CHAR NN='f', [lineAppearance] STR NN='call-appr', [perButtonRingControl] CHAR NN='t', [securityCode] STR(8) NN, [selectLastUsedAppearance] CHAR NN='f', [voiceMailNumber] STR, [specificLineSelectFACsAllowed] CHAR='t', [hasExpansionModule] CHAR='f', [callWaitingIndication] CHAR='f', [restrictLastAppearance] CHAR='t', [lossGroup] INT, [mWIServedUserType] STR='sip-adjunct', [userOrCrgType_choice] STR NN='csUser_id', [collectiveRingingGroup_id] INT);

128) CREATE TABLE [StationADList] ([id], [station_id] INT NN, [tindex] INT NN, [listType] STR NN, [listNumber] INT);

129) CREATE TABLE [StationButton] ([id], [station_id] INT NN, [tindex] INT NN, [buttonType] STR NN, [data1] STR, [data2] STR, [data3] STR);

130) CREATE TABLE [StationTypeProperty] ([id], [stationType] STR NN UNIQUE, [mapToNativeType] STR(25) NN, [protocolType] STR NN='sip', [supportsAST] CHAR NN='f', [buttonStartNormal] INT NN=0, [buttonEndNormal] INT NN=0, [buttonStartFeatures] INT NN=0, [buttonEndFeatures] INT NN=0, [buttonStartSoftkeys] INT NN=0, [buttonEndSoftKeys] INT NN=0, [buttonStartExpansion] INT NN=0, [buttonEndExpansion] INT NN=0, [gapStartExpansion] INT NN=0, [fidOffsetForGapExpansion] INT NN=0, [buttonVoiceMail] INT NN=0, [buttonFixedMute] INT NN=0, [multimediaMode] STR NN='basic', [requiredNumberOfButtons] INT NN=0, [defaultNumberOfButtons] INT NN=3, [xMobileType] STR, [xMobilityTrunkGroupNumber] INT, [lengthOfDisplay] STR, [mappingMode] STR, [buttonSupportScheme] STR='ButtonType', [supportsIPSoftphone] CHAR NN='t', [supportsSpecificLineSelectFACAllowed] CHAR NN='t', [supportsAudibleMessageWaiting] CHAR NN='t', [application] STR, [trunkSelection] STR(3), [configurationSet] INT, [callLimit] INT, [supportsIdleAppearancePreference] CHAR='t', [hasDisplay] CHAR NN='f', [supportsLineAppr] CHAR NN='f', [supportsUnicode] CHAR NN='t');

131) CREATE TABLE [SyncBri] ([source] STR='local', [switching] CHAR='f');
132) CREATE TABLE [SyncBriExternal] ([candidate] STR='Primary', [slot] INT NN);
133) CREATE TABLE [SyncBriPrimaryPorts] ([id], [port] INT NN UNIQUE);
134) CREATE TABLE [SyncBriSecondaryPorts] ([id], [port] INT NN UNIQUE);
135) CREATE TABLE [SystemDialCode] ([id], [abbreviatedDialSystemList_id] INT NN, [tindex] INT NN UNQ, [dialCodeString] STR(24), [dialCodeLabel] STR(13) NN='Dial Code nn');
136) CREATE TABLE [SystemParameter] ([id], [applyMCTWarningTone] CHAR NN='f', [conferenceTone] CHAR NN='f', [musicToneOnHold] STR NN='none', [trunktoTrunkTransfer] STR NN='restricted', [mohSystemParameterType] STR, [musicExtension_id] INT, [mohAnalogPort] STR(7), [autoAbbreviatedDelayedTransitionIntervalRings] INT=2, [callParkTimeoutIntervalMinutes] INT=5, [longHoldRecallTimerSeconds] INT=60, [mCTVoiceRecorderTrunkGroup] INT, [repetitiveCallWaitingIntervalSeconds] INT=10, [stationCallTransferRecallTimer] INT=20, [abortTransfer] CHAR NN='t', [autoHold] CHAR NN='t', [automaticExclusionByCOS] CHAR NN='t', [directedCallPickup] CHAR NN='t', [prohibitBridgingOntoCallsWithDataPrivacy] CHAR NN='t', [repetitiveCallWaitingTone] CHAR NN='t', [transferUponHangUp] CHAR NN='t', [deluxePagingAndCallParkTimeoutToOriginator] CHAR NN='t', [selfStationDisplayEnabled] CHAR NN='t', [cvgOfCallsRedirOffNetEnabled] CHAR NN='f', [localCVGSubsequentRedirCFWDNoAnsIntervalRings] INT=2, [offNetcvgSubsequentRedireCFWDNoAnsIntervalRings] INT=2, [rtcpDefaultServerIP] STR(15), [rtcpDefaultServerPort] INT=5005, [cpeAlarmActivation] STR NN='none', [schedMaintStartHour] INT=22, [schedMaintStartMinute] INT=0, [schedMaintStopHour] INT=6, [schedMaintStopMinute] INT=0, [saveTranslations] STR NN='no', [displayCHARSet] STR NN='Roman', [ToneDetectionMode] INT NN=6, [interdigitPause] STR NN='short', [systemCESIDDefault] STR(11) NN='0', [holdRecallRedirectExtension_id] INT, [secondHoldRecallTimerSecs] INT NN=30, [branchPrefix] STR(15), [coreRouterIPAddr] STR, [admmIPAddr] STR, [cpnAniIclidReplacementForRestricted] STR(15)='Restricted', [cpnAniIclidReplacementForUnavailable] STR(15)='Unavailable', [dateFormatOnCertainTerminals] STR NN='mm/dd/yy', [onhookDialingOnCertainTerminals] CHAR NN='t', [displayFormat6DigitExtensions] STR(8) NN='xxxxxx', [displayFormat7DigitExtensions] STR(8) NN='xxxxxxx', [internationalCPNPrefix] STR(5), [nationalCPNPrefix] STR(5), [answerSupervisionByCallClassifier] CHAR NN='t', [DefaultPrivilegeLevel] STR NN='6', [authorizationCodeEnabled] CHAR NN='f', [authorizationCodeLength] INT=7, [authorizationCodeCancellationSymbol] STR (1)='#', [attendantTimeOutFlag] CHAR NN='f', [displayAuthorizationCode] CHAR NN='f', [ipPhoneSnmpDownload] CHAR NN='f', [ipPhoneSnmpCommunityString] STR, [ipPhoneSnmpIpAddress_1] STR(33), [ipPhoneSnmpIpAddress_2] STR(33), [ipPhoneSnmpIpAddress_3] STR(33), [ipPhoneSnmpIpAddress_4] STR(33), [ipPhoneSnmpIpAddress_5] STR(33), [ipPhoneSnmpIpAddress_6] STR (33), [enableBusyToneDisconnect] CHAR NN='t', [servicesProcPassword] STR(33)='27238', [stationToneForwardDisconnect] STR='silence', [multiFrequencySignalingEnabled] CHAR NN='t');
137) CREATE TABLE [Telephone] ([id], [csUser_id] INT NN, [telephone] STR NN UNQ, [telephoneType] STR NN, [version] INT NN);
138) CREATE TABLE [TerminalParameter] ([id], [baseParameterSet302] STR NN='1', [baseParameterSet6400] STR NN='1', [baseParameterSet8400] STR NN='1');
139) CREATE TABLE [TimeZone] ([selectedTimeZone] STR NN='America/New_York', [userDefinedTimeZone] BLOB);
140) CREATE TABLE [TollAnalysis] ([id], [dialedString] STR(18) NN, [totalMin] INT NN, [totalMax] INT NN);
141) CREATE TABLE [ToneCadence] ([id], [toneName] STR NN='busy', [instance] INT NN UNIQUE=1, [toneContinuous] CHAR NN='f');
142) CREATE TABLE [ToneCycle] ([id], [cycle] INT NN=1, [ToneCadence_id] INT NN, [on Min] INT NN, [on Max] INT NN, [offMin] INT NN, [offMax] INT NN);
143) CREATE TABLE [ToneGeneration] ([id], [baseToneGeneratorSetCountryName] STR='United States', [baseToneGeneratorSet] STR NN='1', [b440 HZPBXDialTone] CHAR NN='f', [b440 HZSecondaryDialTone] CHAR NN='f');
144) CREATE TABLE [ToneGenerationCustomizedTone] ([id], [toneName] STR NN UNQ);
145) CREATE TABLE [ToneGenerationCustomizedToneStep] ([id], [toneGenerationCustomizedTone_id] INT NN, [tindex] INT NN, [toneFrequency] STR NN, [duration] INT, [step] INT);
146) CREATE TABLE [TrunkGroup] ([id], [trunkGroupNumber] INT UNIQUE, [trunkGroupType] STR NN, [trunkGroupName] STR(64) NN UNIQUE, [trunkGroupName2] STR(64), [trunkGroupName2ScriptTag] STR (64)= '00000003', [cOR_id] INT NN, [tAC] STR(4) NN, [direction] STR NN='two-way', [dialAccess] CHAR NN='t', [serviceType] STR NN='public-ntwrk', [prefix 1] CHAR NN='f', [tollRestricted] CHAR NN='f', [incomingDestination] INT, [codesetToSendDisplay] STR NN='6', [codesetToSendNationalIEs] STR NN='6', [maxMessageSizeToSend] STR NN='260', [chargeAdvice] STR NN='none', [supplementaryServiceProtocol] STR NN='a', [digitHandlingInOut] STR NN='enbloc/enbloc', [trunkHunt] STR NN='cyclical', [incomingCallingNumberDelete] STR(3), [incomingCallingNumberinsert] STR(15), [disconnectSupervisionIn] CHAR NN='t', [disconnectSupervisionOut] CHAR NN='f', [answerSupervisionTimeout] INT=10, [expectedDigits] INT, [dropTreatment] STR='silence', [digitTreatment] STR, [digits] STR (4), [signalBitInversion] STR NN='none', [incomingDialTone] CHAR NN='f', [incomingGlareMsec] INT NN=1500, [ringingMonitorMsec] INT NN=5200, [outgoingEndOfDialSec] INT NN=10, [programmedDialPauseMsec] INT NN=1500, [outgoingDialGuardMsec] INT NN=1600, [outgoingGlareGuardMsec] INT NN=1500, [outgoingRotaryInterdigitMsec] INT NN=800, [incomingSeizureMsec] INT NN=500, [outgoingSeizureResponseSec] INT NN=5, [toneMsec] INT NN=350, [pauseMsec] INT NN=150, [outpulsePPS] CHAR(2) NN='10', [outpulseMakeMsec] INT NN=40, [outpulseBreakMsec] INT NN=60, [outpulsePPM] CHAR NN='f', [trunkGain] STR NN='high', [chargeConversion] INT=1, [decimalPoint] STR NN='none', [currencySymbol] STR(3), [chargeType] STR(7)='units', [disconnectTimingMsec] INT=500, [trunkTermination] STR NN='rc', [callStillHeld] CHAR NN='f', [receiveAnswerSupervision] CHAR NN='f', [country] STR='1', [version] STR='a', [holdUnholdNotifications] CHAR NN='f', [disconnectSignalErrorSec] INT=30, [uSNIDelayedCallingNameUpdate] CHAR NN='t', [applyLocalRingback] CHAR NN='f', [connectedToCO] CHAR NN='t', [incomingDisconnectMsec] INT=500, [incomingIncompleteDialAlarmSec] INT=255, [incomingDialGuardMsec] INT=70, [incomingDialType] STR NN='tone', [incomingToneANI] STR NN='no', [sendName] STR NN='r', [sendCallingNumber] STR NN='r', [suppressPoundOutPulsing] CHAR NN='f', [outgoingChannelIDEncoding] STR NN='preferred', [sendConnectedNumber] STR NN='n', [sendUUIIE] CHAR NN='t', [sendUCID] CHAR NN='f', [networkJapaneseConnectBefore] CHAR NN='f', [outgoingDisconnectMsec] INT=500, [outgoingDialType] STR NN='tone', [trunkType] STR='loop-start', [numberingFormat] STR='public', [ds1SignalingMode] STR='isdn-pri', [cesidIDigitSent] STR(3), [camaOutgoingDialGuardMsec] INT=75, [camaWinkStartTimerMsec] INT=5000, [carrierMedium] STR, [memberAssignmentMethod] STR, [replaceRestrictedNumbers] CHAR='t', [replaceUnavailableNumbers] CHAR='t', [dslEchoCancellation] CHAR='t', [private] CHAR NN='f', [loudspeaker] CHAR NN='f', [analogLossGroup] INT, [digitalLossGroup] INT, [cDRRReports] CHAR='t', [authCode] CHAR NN='f', [prependPlus] CHAR='f', [telEventPayloadType] INT=127, [prefMinSessionRefreshIntervalSec] INT=600, [busyToneDisconnect] CHAR NN='f', [trunkFlash] CHAR NN='t', [trunkflashLengthMsec] INT NN=2000, [receiveAnalogIncomingCallID] STR NN='disabled', [MFTariffFree] CHAR NN='f');

147) CREATE TABLE [TrunkGroupMember] ([id], [trunkGroup_id] INT NN, [tindex] INT NN, [groupPort] CHAR (7), [name] STR(10), [signalingGroup_id] INT, [numberOfMembers] INT=1);

148) CREATE TABLE [TwoPartyLossPlan] ([id], [fromLossGroup] INT NN, [toLossGroup] INT NN, [loss] INT NN=0);

149) CREATE TABLE [UserLoginSession] ([id], [csUser_id] INT NN, [hostAddress] STR NN, [lockoutTime] CHAR(100) NN, [isActive] CHAR NN='t', [isDupLoginAllowed] CHAR NN='t', [version] INT NN);

150) CREATE TABLE [UserPrivilegeToFeatureButton] ([id], [privilegeLevel] STR NN='2', [buttonType] STR NN, [buttonPrivilege] STR NN='allow');

151) CREATE TABLE [VoIPParameters] ([id], [voipID] STR(6) NN UNQ, [voipVal] STR(6) NN);

In some embodiments, the acts of the method of FIG. 2 are all performed by a single computer process, except for the generation of processes 132 and/or 134, when necessary. Alternatively, two different processes, possibly on two different computers, perform the conversion from data file 120 into intermediate format 122 and from intermediate format 122 into new format file 124.

In the above example, the TPV includes configuration elements for several types of trunks, including ISDN trunks, BRI trunks and DS1 trunks. As many different types of trunks are used around the world, not all versions of the TPV include configuration elements for all types of trunks. If a user needs to support a trunk not defined already in the TPV, the user may expand the TPV by adding configuration elements for such additional TPV, before performing the conversion. Such an update of the TPV may be performed also for other configuration elements not available in an originally supplied TPV.

CONCLUSION

Although the above description refers to telephony devices, the concepts of the present invention may be used with other administrable devices having similar configuration fields, such as firewall devices and/or quality of service (QoS) enforcement devices. It will be noted, however, that a different intermediate vocabulary needs to be defined for such other devices.

It will be appreciated that the above described methods may be varied in many ways, including, changing the order of steps, and/or performing a plurality of steps concurrently. It will also be appreciated that the above described description of methods and apparatus are to be interpreted as including apparatus for carrying out the methods and methods of using the apparatus.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method, comprising:
   receiving, from a first telephony device and by a processor, a first telephony configuration file, the first telephony configuration file comprising a plurality of first configuration fields having respective first parameter values and having a first configuration file format;
   converting, by the processor, the first telephony configuration file into an intermediary configuration file comprising intermediary configuration fields corresponding to the plurality of first configuration fields, a first set of intermediary configuration fields having parameter values derived from the first parameter values;
   converting, by the processor, the intermediary configuration file into a second telephony configuration file comprising a plurality of second telephony configuration fields having respective second parameter values derived from the parameter values of the intermediary configuration fields, wherein the second telephony configuration file corresponds to a second telephony device different from the first telephony device, wherein the intermediary configuration file format is not supported by the first and second telephony devices, wherein the second telephony configuration file is supported by the second telephony device but not the first telephony device, and wherein the second telephony device is to replace the first telephony device.

2. The method according to claim 1, wherein generating the intermediary configuration file includes generating a file format not supported by any telephony device.

3. The method according to claim 1, comprising evaluating a complexity of telephony devices based on a comparison of their configuration fields to the intermediary configuration file format.

4. The method according to claim 1, wherein the first and second telephony devices comprise phones.

5. The method according to claim 4, comprising transferring configuration settings of a third telephony device to a second telephony device, by converting third configuration values of the third telephony device into the intermediary telephony configuration file format and the second telephony configuration file.

6. The method according to claim 4, wherein the intermediary telephony configuration file format includes more configuration fields than both the first and second telephony devices have together.

7. The method according to claim 4, wherein the intermediary telephony configuration file format includes configuration fields relating to a plurality of different communication protocol layers.

8. The method according to claim 1, wherein the intermediary configuration file format includes a plurality of configuration fields belonging to a user profile category and at least one of the following categories:
routing,
physical layout, and
automatic call handling.

9. The method according to claim 1, wherein the intermediary configuration file format includes a plurality of configuration fields belonging to a user profile category and an automatic call handling group.

10. A non-transitory computer readable medium executable by a processor, the computer readable medium including instructions, the instructions comprising:
instructions to receive, from a first telephony device, a first telephony configuration file, the first telephony configuration file comprising a plurality of first configuration fields having respective first parameter values and having a first configuration file format;
instructions to convert the first telephony configuration file into an intermediary configuration file comprising intermediary configuration fields corresponding to the plurality of first configuration fields, a first set of intermediary configuration fields having parameter values derived from the first parameter values;
instructions to convert the intermediary configuration file into a second telephony configuration file comprising a plurality of second telephony configuration fields having respective second parameter values derived from the parameter values of the intermediary configuration fields, wherein the second telephony configuration file corresponds to a second telephony device different from the first telephony device, wherein the intermediary configuration file format is not supported by the first and second telephony devices, wherein the second telephony configuration file is supported by the second telephony device but not the first telephony device, and wherein the second telephony device is to replace the first telephony device.

11. The non-transitory computer readable medium according to claim 10, wherein converting the first parameter values into intermediary parameter values comprises dumping as a sequence of values of configuration fields, without statements in a high level computer language or a human language, linking between the configuration fields.

12. The non-transitory computer readable medium according to claim 10, wherein converting the first parameter values comprises dumping values organized in a plurality of tables, each table including one or more records.

13. The non-transitory computer readable medium according to claim 10, wherein the first telephony device comprises a private branch exchange.

14. The non-transitory computer readable medium according to claim 10, wherein the intermediary configuration file includes more configuration fields than both the first and second telephony devices have together.

15. The non-transitory computer readable medium according to claim 10, wherein the intermediary configuration file includes a plurality of configuration fields belonging to each of the following categories: user profile, routing, physical layout, and automatic call handling.

16. The non-transitory computer readable medium according to claim 10, comprising providing an indication of configuration fields included in the intermediary configuration file not supported by the first telephony device or by the second telephony device.

17. The non-transitory computer readable medium according to claim 10, wherein providing an indication of configuration fields included in the intermediary configuration file not supported by the second telephony device comprises providing an indication of configuration fields supported by at least a predetermined percentage of examined devices but not supported by the second telephony device.

18. The non-transitory computer readable medium according to claim 10, comprising providing a list of configuration fields for which the conversion into the intermediary configuration file was not successful.

19. The non-transitory computer readable medium according to claim 18, comprising changing a design of the first telephony device or the second telephony device responsive to the list of configuration fields.

20. A configuration aiding apparatus, comprising:
an interface;
a processor in communication with the interface, the processor configured to:
receive, from a first telephony device, a first telephony configuration file, the first telephony configuration file comprising a plurality of first configuration fields having respective first parameter values and having a first configuration file format;
convert the first telephony configuration file into an intermediary configuration file comprising intermediary configuration fields corresponding to the plurality of first configuration fields, a first set of intermediary configuration fields having parameter values derived from the first parameter values;
convert the intermediary configuration file into a second telephony configuration file comprising a plurality of second telephony configuration fields having respective second parameter values derived from the parameter values of the intermediary configuration fields, wherein the second telephony configuration file corresponds to a second telephony device different from the first telephony device, wherein the intermediary configuration file format is not supported by the first and second telephony devices, wherein the second telephony configuration file is supported by the second telephony device but not the first telephony device, and wherein the second telephony device is to replace the first telephony device.

* * * * *

UNITED STATES PATENT AND TRADEMARK OFFICE
CERTIFICATE OF CORRECTION

PATENT NO. : 8,094,680 B1
APPLICATION NO. : 12/235915
DATED : January 10, 2012
INVENTOR(S) : Ronen Ben Chetrit and Itai Ephraim Zilbershtein Page 1 of 1

It is certified that error appears in the above-identified patent and that said Letters Patent is hereby corrected as shown below:

At Column 25, line 5, after the word "and" please insert the word --to-- therein.

Signed and Sealed this
Twenty-seventh Day of March, 2012

David J. Kappos
*Director of the United States Patent and Trademark Office*